(12) United States Patent
Sutton et al.

(10) Patent No.: US 10,197,154 B2
(45) Date of Patent: Feb. 5, 2019

(54) VEHICLE CONTROL SYSTEM AND METHOD

(71) Applicant: Jaguar Land Rover Limited, Whitley Coventry Warwickshire (GB)

(72) Inventors: Simon Sutton, Rugby (GB); Steve Mullane, Southam (GB); Malkit Ram, Coventry (GB); Sam Burt, Leamington Spa (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 380 days.

(21) Appl. No.: 14/907,512

(22) PCT Filed: Jul. 24, 2014

(86) PCT No.: PCT/EP2014/065924
§ 371 (c)(1),
(2) Date: Jan. 25, 2016

(87) PCT Pub. No.: WO2015/011229
PCT Pub. Date: Jan. 29, 2015

(65) Prior Publication Data
US 2016/0160998 A1    Jun. 9, 2016

(30) Foreign Application Priority Data

Jul. 25, 2013    (GB) .................................. 1313258.4

(51) Int. Cl.
*F16H 61/02*    (2006.01)
*B60K 17/346*    (2006.01)
(Continued)

(52) U.S. Cl.
CPC ..... *F16H 61/0204* (2013.01); *B60K 17/3467* (2013.01); *B60W 10/111* (2013.01);
(Continued)

(58) Field of Classification Search
CPC .............. F16H 61/0204; F16H 61/702; F16H 2061/0234
See application file for complete search history.

(56) References Cited

U.S. PATENT DOCUMENTS 5,522,777 A    7/1996  Baxter et al.
5,970,810 A *  10/1999  Wadas ................ F16H 63/3023
                                                        74/335
(Continued)

FOREIGN PATENT DOCUMENTS

EP    1258387 A2    11/2002
GB    2495564 A     4/2013
(Continued)

OTHER PUBLICATIONS

Combined Search and Examination Report corresponding to application No. GB1313258.4, dated Feb. 5, 2014, 7 pages.
(Continued)

*Primary Examiner* — Edwin A Young
(74) *Attorney, Agent, or Firm* — Reising Ethington P.C.

(57) ABSTRACT

Aspects of the present invention relate to a vehicle control system (1) for controlling a vehicle transfer case (3). The transfer case (3) is operable in a high range and a low range. The vehicle control system (1) is configured to determine an operating range for the transfer case (3) based on a selected vehicle operating mode. A range change signal is output to implement a range change to engage the determined operating range. The present invention also relates to a vehicle (5) and a related method of operating a vehicle control system (1).

20 Claims, 7 Drawing Sheets

(51) Int. Cl.
*F16H 61/70* (2006.01)
*B60W 10/111* (2012.01)
*F16H 63/42* (2006.01)
*F16H 61/00* (2006.01)

(52) U.S. Cl.
CPC .......... *F16H 61/702* (2013.01); *F16H 63/42* (2013.01); *B60W 2520/10* (2013.01); *B60W 2540/04* (2013.01); *F16H 2061/0096* (2013.01); *F16H 2061/0234* (2013.01); *F16H 2063/426* (2013.01)

(56) References Cited

U.S. PATENT DOCUMENTS

| | | | |
|---|---|---|---|
| 5,993,354 A | 11/1999 | Winks | |
| 6,237,712 B1* | 5/2001 | Lehman | F16H 59/70 |
| | | | 180/337 |
| 6,579,208 B2* | 6/2003 | Oliveira | B60W 10/02 |
| | | | 477/110 |
| 8,960,034 B2 | 2/2015 | Takahashi | |
| 2001/0029221 A1 | 10/2001 | Oliveira et al. | |
| 2007/0016351 A1 | 1/2007 | Allen et al. | |
| 2014/0330493 A1 | 11/2014 | Vincent et al. | |
| 2015/0039167 A1 | 2/2015 | Ideshio et al. | |
| 2015/0057883 A1 | 2/2015 | Kelly et al. | |

FOREIGN PATENT DOCUMENTS

| | | |
|---|---|---|
| JP | 2002356117 A | 12/2002 |
| JP | 2011131618 A | 7/2011 |
| WO | 2011097244 A2 | 8/2011 |
| WO | 2012127655 A1 | 9/2012 |
| WO | 2013120546 A1 | 8/2013 |
| WO | WO201308333 A1 | 6/2016 |

OTHER PUBLICATIONS

International Search Report corresponding to International application No. PCT/EP2014/065924, dated Oct. 13, 2014, 3 pages.
Written Opinion corresponding to International application No. PCT/EP2014/065924, dated Oct. 13, 2014, 5 pages.
Japanese Office Action in Japanese with English Summary for JP application No. 2016-528533, dated Jan. 24, 2017, 6 pages.

* cited by examiner

VEHICLE CONTROL SYSTEM AND METHOD

TECHNICAL FIELD

The present invention relates to a vehicle control system; a method of controlling a transfer case; and a vehicle.

BACKGROUND OF THE INVENTION

It is known to provide vehicles with a transfer case (also referred to as a reduction gearbox) to provide additional drive ranges. The transfer case is typically coupled to an output shaft from a transmission and, in a four-wheel drive vehicle, provides drive to the front and rear axles via front and rear propeller shafts. The torque delivered to the front and rear axles can be the same (i.e. 50:50 distribution) or different. The transfer case can also include a reduction gear set, for example a helical reduction or an epicyclic reduction gear set, to provide high and low drive ranges. The high range can provide a 1:1 ratio (i.e. direct drive) and the low range can provide a reduction gearing, for example 2.69:1.

The transfer case has particular application in off-road vehicles where the low range can increase the torque delivered at the wheels and provide improved low-speed control. High range should be used for all normal road driving and also for off-road driving across dry, level terrain. Low range should only be required where low speed manoeuvring is necessary, such as reversing a trailer, negotiating steep slippery surfaces or boulder strewn terrain. Low range should also be used for extreme off-road conditions where progress in high range cannot be maintained. Low range should not normally be used for normal road driving.

The transfer case can also include a synchroniser to enable dynamic range changes while the vehicle is travelling (referred to as shift-on-the-fly or shift-on-the-move control). By way of example, the transfer box can facilitate range changes when the vehicle is moving, within set limitations as follows:

High to Low—at speeds not exceeding 10 mph (16 km/h)
Low to High—at speeds not exceeding 30 mph (48 km/h).

If no synchroniser is fitted, static range changes are typically implemented with the vehicle stationary. The transfer case range changes from low to high are referred to herein as upshifts, and the transfer case range changes from high to low are referred to herein as downshifts. The transfer case can also be moved into a neutral position for towing the vehicle.

SUMMARY OF THE INVENTION

Aspects of the present invention relate to a vehicle control system; a method of controlling a transfer case; and a vehicle.

According to an aspect of the present invention there is provided a vehicle control system for controlling a vehicle transfer case operable in a high range and a low range; the control system being configured to:
    determine an operating range for the transfer case based on a selected vehicle operating mode; and
    output a range change signal to implement a range change to engage the determined operating range. The control system can implement a range change to match the selected vehicle operating mode. At least in certain embodiments, the driver input required to control the transfer case can be reduced. The control system can require driver confirmation prior to output of the range change signal to implement the range change or can perform the range change automatically. At least in certain embodiments of the present invention the control system can enable semi- or fully-autonomous operation of the transfer case. The vehicle control system can be in the form of a transfer case control module. The transfer case control module can comprise said transfer case selection means.

The vehicle operating modes can define the dynamic operating parameters of the vehicle. For example, the vehicle operating modes can define one or more of the following operating parameters: steering response, throttle response, engine mapping, brake mapping, output torque, anti-lock braking control, wheel slip parameters, transmission control and so on. The vehicle operating modes can be characterised by particular maps for the various vehicle controls, for example one or more of the following: steering, throttle pedal, brake pedal, transmission control. The selection of the vehicle operating mode can be performed by the user, for example using operating mode selector, such as a rotary dial, one or more switches or buttons, or a touch-screen interface. Alternatively, the selection of the vehicle operating mode can be performed automatically.

The control system can be configured to receive an operating mode signal indicating a selected vehicle operating mode. The operating mode signal can be published to a communications network and/or transmitted to the control system. The control system can be configured to access a look-up table to identify the operating range defined for the selected vehicle operating mode. Alternatively, the control system could be configured to receive a control signal from an operating mode controller. For example, the operating mode controller could transmit a transfer case range request signal to the control system to request selection of a transfer case operating range associated with the selected vehicle operating mode.

The control system can be configured to identify the selected vehicle operating mode from a plurality of vehicle operating modes. The vehicle operating modes can include one or more off-road operating modes. The off-road operating modes can comprise one or more low range off-road modes requiring that the transfer case operates in said low range; and one or more high range off-road modes requiring that the transfer case operates in said high range. The low range off-road modes can comprise a rock crawl mode and/or a mud mode. The high range off-road modes can comprise a sand mode and/or a grass/gravel/snow (GGS) mode.

The control system can be configured to output said range change signal to implement a change from said high range to said low range (i.e. a transfer case downshift) when the vehicle operating mode changes from the or one of said high range off-road operating mode or modes to the or one of said low range off-road operating mode or modes. The control system could optionally output a range change signal to implement a change from said low range to said high range when the vehicle operating mode changes from the or one of said low range off-road operating mode or modes to the or one of said high range off-road operating mode or modes. Alternatively, the control system can remain in said low range when the vehicle operating mode changes from a low range off-road operating mode to a high range off-road operating mode.

The vehicle operating modes can comprise at least one on-road operating mode requiring that the transfer case operates in said high range. The at least one on-road mode can be a Road mode and/or a Dynamic mode.

The control system can be configured to output said range change signal to implement a change from said low range to said high range (i.e. a transfer case upshift) when the vehicle operating mode changes from a low range off-road operating mode to said at least one on-road operating mode.

The vehicle operating modes can comprise a towing mode. The towing mode can be identified by a towing signal published to the communications network when a trailer is electrically coupled to the vehicle. Alternatively, or in addition, the towing mode can be identified by correlating torque request with vehicle speed and/or acceleration. The towing mode could also be selected manually by the driver.

When said towing mode is selected, the control system can be configured to output said range change signal to implement a range change based on vehicle speed. The control system can be configured to output said range change signal to implement a range change from the low range to the high range when the vehicle speed increases above a towing speed threshold; and/or the control system can be configured to output said range change signal to implement a range change from the high range to the low range when the vehicle speed decreases below a towing speed threshold. The towing speed threshold can, for example, be 30 km/h.

The vehicle operating modes can comprise a hill climb assist mode. The hill climb assist mode can be selected automatically, for example based on a measured or estimated vehicle attitude. Alternatively, or in addition, the hill climb assist can be selected manually.

When said hill climb assist mode is selected, the control system can be configured to output said range change signal to implement a range change based on vehicle speed. The control system can be configured to output said range change signal to implement a range change from the high range to the low range when the vehicle speed decreases to zero. The control system can be configured to output said range change signal to implement a range change from the low range to the high range when the vehicle speed increases above a hill climb threshold.

The control system can provide semi- or fully- autonomous control of the transfer case. The control system can be configured to output said range change signal automatically upon identification of the change in vehicle operating mode. The control system can be configured to output a user prompt requesting confirmation to implement said range change upon identification of a change in the vehicle operating mode. The control system can be configured to output said range change signal in dependence on receipt of a confirmation signal from the user, for example by activating a selection means.

According to an aspect of the present invention there is provided a vehicle comprising a control system as described herein.

According to an aspect of the present invention there is provided a method of controlling a vehicle transfer case operable in a high range and a low range; the method comprising:
  determining an operating range for the transfer case based on a selected vehicle operating mode; and
  outputting a range change signal to implement a range change to engage the determined operating range. The method(s) described herein can be machine-implemented.

The method can comprise receiving an operating mode signal indicating a selected vehicle operating mode. The method can comprise accessing a look-up table to identify the operating range defined for the selected vehicle operating mode.

The vehicle operating mode can be selected from a plurality of vehicle operating modes. The vehicle operating modes can comprise a plurality of off-road operating modes. The off-road operating modes can comprise one or more low range off-road modes requiring that the transfer case operates in said low range; and one or more high range off-road modes requiring that the transfer case operates in said high range. The low range off-road modes can comprise rock crawl and mud. The high range off-road modes can comprise sand and grass/gravel/snow (GGS).

The method can comprise outputting said range change signal to implement a change from said high range to said low range when the vehicle operating mode changes from a high range off-road operating mode to a low range off-road operating mode.

The vehicle operating modes can comprise at least one on-road operating mode requiring that the transfer case operates in said high range. The on-road operating mode can be Road and/or Dynamic, for example. The range change signal can implement a change from said low range to said high range (i.e. a transfer case upshift) when the vehicle operating mode changes from a low range off-road operating mode to said at least one on-road operating mode.

The vehicle operating modes can comprise a towing mode. The towing mode can be identified by a towing signal published to the communications network when a trailer is electrically coupled to the vehicle. Alternatively, the towing mode can be selected manually. The method can comprise outputting said range change signal to implement a range change based on vehicle speed in dependence on selection of said towing mode. The method can comprise outputting said range change signal to implement a range change from the low range to the high range when the vehicle speed increases above a towing speed threshold; and/or outputting said range change signal to implement a range change from the high range to the low range when the vehicle speed decreases below a towing speed threshold.

The vehicle operating modes can comprise a hill climb assist mode. The hill climb assist mode can be selected automatically, for example based on a measured or estimated vehicle attitude. Alternatively, or in addition, the hill climb assist can be selected manually. The method can comprise outputting said range change signal to implement a range change based on vehicle speed when said hill climb assist mode is selected. The method can include outputting said range change signal to implement a range change from the high range to the low range when the vehicle speed decreases to zero. The method can comprise outputting said range change signal to implement a range change from the low range to the high range when the vehicle speed increases above a hill climb threshold.

At least in certain embodiments of the present invention, the method can provide semi- or fully-autonomous control of the vehicle transfer case. The method can comprise outputting said range change signal automatically upon selection of the vehicle operating mode. Alternatively, the method can comprise outputting a user prompt requesting confirmation to implement said range change upon identification of the change in vehicle operating mode. The method can comprise outputting said range change signal in dependence on receipt of a confirmation signal from the user, for example by activating a selection means.

The vehicle control system described herein can take the form of a control apparatus, for example comprising one or more control modules. The control modules can each contain one or more processors which can function independently of each other or in parallel. The control modules can be disposed in a system architecture, for example communicating with each other over a network.

The methods described herein can be computer-implemented, for example on a computational apparatus or computer comprising one or more processors. According to a yet further aspect of the present invention there is provided a computer program product comprising a computer readable storage medium including computer readable program code, where the computer readable program code when executed on a computer causes the computer to perform the method(s) described herein.

The term processor used herein is to be understood as covering both single processors and multiple processors. For example, the processing steps described herein could be performed by a single processor; or could be performed by separate processors. The processors could, for example, be provided in different control modules making up a vehicle control system. Thus, the vehicle control system can be integrated into a vehicle systems architecture incorporating one or more control modules in communication with each other over a network.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

A vehicle control system 1 incorporating a transfer case control module (TCCM) 2 in accordance with an embodiment of the present invention is described herein with reference to the accompanying Figures. The TCCM 2 is operable to control a transfer case 3 of a vehicle 5 to change between high and low ranges.

Figure 1:
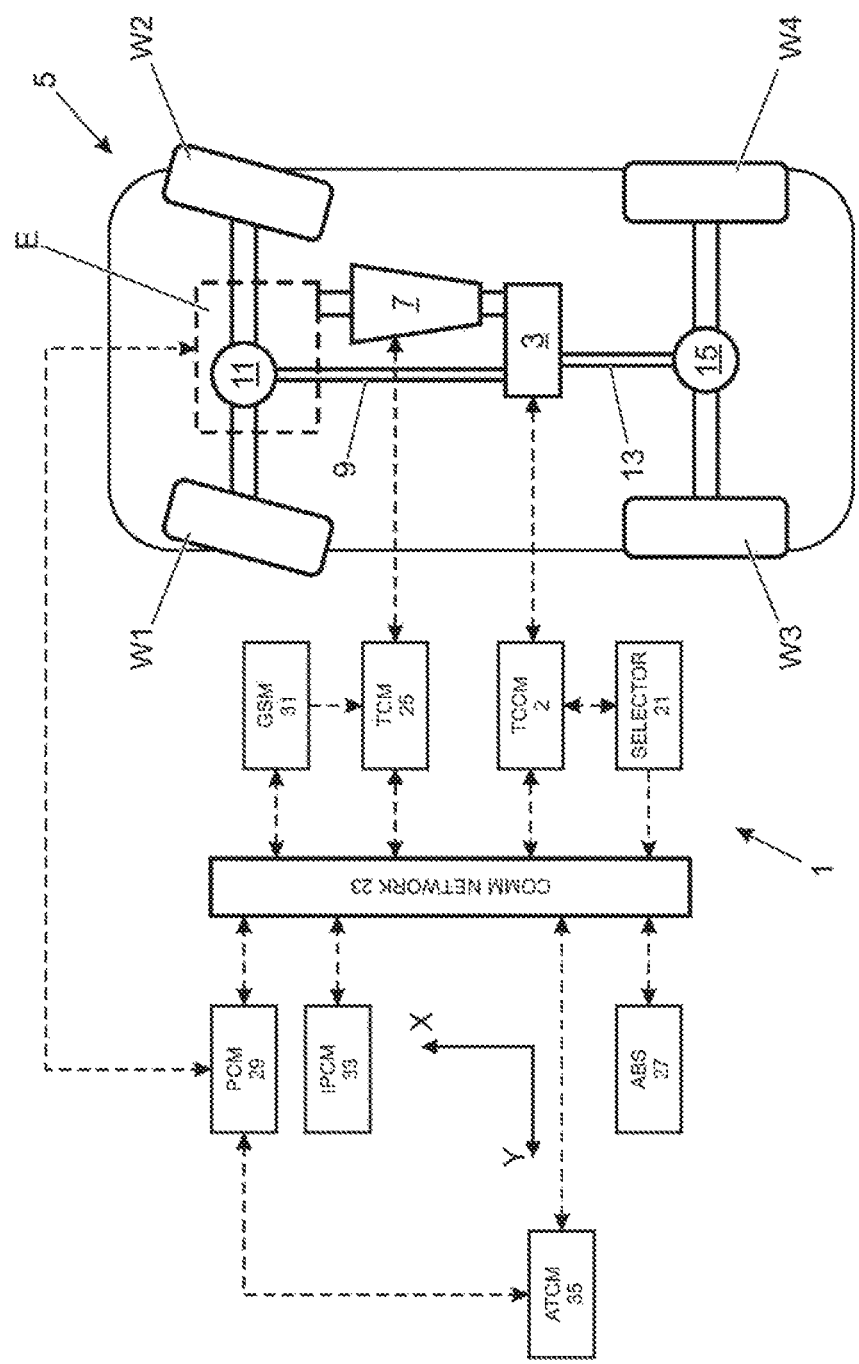
FIG. 1 shows a schematic representation of a vehicle incorporating a vehicle control system in accordance with an embodiment of the present invention.

With reference to FIG. 1, the TCCM 2 and the transfer case 3 are installed in the vehicle 5. The vehicle 5 has two front wheels W1, W2 and two rear wheels W3, W4 and a drive torque can be selectively delivered to each of the wheels W1-4 (i.e. the vehicle has four wheel drive 4WD). An internal combustion engine E (shown in phantom in FIG. 1) is provided for delivering torque to the wheels W1-4. The invention can also be implemented in a vehicle 5 utilising one or more electric machines to drive the wheels W1-4, for example a hybrid electric vehicle (HEV) or an electric vehicle (EV). The present invention could be applied in other All-Wheel Drive (AWD) vehicles, for example vehicles comprising six wheels.

The transfer case 3 is mounted to a transmission 7 in the vehicle 5. The transfer case 3 enables a transfer of drive from a single transmission output to a twin output to deliver torque to the front wheels W1, W2 via a front drive (propeller) shaft 9 and front differential 11, and to the rear wheels W3, W4 via a rear drive (propeller) shaft 13 and rear differential 15. The transfer case 3 comprises a centre differential to allow a speed difference across the front and rear drive shafts 9, 13. In order to aid off road traction, the transfer case 3 comprises a reduction gear set to provide a twin speed transfer case 3 selectively operable in a high range (direct drive) and a low range (reduction drive). The transfer case 3 comprises a servo actuator, such as an electromagnetic machine, for changing between the high range and the low range. The operation of the servo actuator is controlled by the TCCM 2. The servo actuator can be disposed inside the transfer case 3 or externally of the transfer case 3.

The transfer case 3 can optionally comprise a synchroniser to allow a dynamic change between said high and low ranges. The synchroniser allows the transfer case 3 to complete shifts between the high and low ranges (both from the high range to the low range and vice versa) whilst the vehicle 5 is moving (referred to as shift-on-the-fly or shift-on-the-move control), thereby avoiding the need for the driver to stop the vehicle 5 to complete the range change. The synchroniser matches the rotational speed of the output from the transfer case 3 with the internal rotational speed of the transfer case 3. The transfer case 3 is directly coupled to the front and rear drive shafts 9, 13 and, therefore, is determined by the vehicle (road) speed. The rotational speed of an input shaft for the transfer case 3 should be as close to zero as possible to allow the transfer case 3 to synchronise with the transmission 7 (approximate zero velocity difference). The transmission 7 must select neutral to allow the speed of the input shaft to the transfer case to decrease sufficiently before the transfer case 3 shifts between said high and low ranges. For example, the range change can be performed when the input shaft speed is approximately 100 rpm. The synchroniser can then increase the rotational speed of the transfer case 3 to match the vehicle speed so the transfer case 3 and the output shaft from the transmission 7 are rotating at the vehicle speed. The shift to "drive" and re-engagement of gear is then handled by a torque converter in terms of engine speed synchronisation to vehicle speed.

In prior art arrangements, the driver must first engage neutral in the transmission 7 before changing between high and low transfer case ranges. If the transfer case 3 does not include a synchroniser, only static changes can be performed. In other words, the vehicle 5 must be stopped before the transfer case 3 can change between said high and low ranges. The present invention has applications in transfer cases 3 either with or without a synchroniser and the control strategies implemented to perform static and dynamic shifts are described herein. At least in certain embodiments, the vehicle control system 1 can implement an autonomous or semi-autonomous transfer case range change.

A range change selector 21 is provided to enable the driver to request a range change. When activated, the range change selector 21 generates a range change request signal which is published to a vehicle communication network 23. In the present embodiment, the range change selector 21 comprises selection means in the form of a button which can be depressed by the driver to select a range change. It will be appreciated that the selection means could take other forms, such as a switch, a lever, a capacitance sensor, or a virtual selector displayed on a touchscreen interface. In the present embodiment the selection means also comprise a set of steering wheel controls which provide duplicate controls. The steering wheel controls allow the driver to implement a range change without taking their hands off the steering wheel. Alternatively, or in addition, the selection means could be disposed on the dashboard or centre console.

The TCCM 2 receives data signals from other on-board electronic modules over the vehicle communications network 23. In particular, the TCCM 2 is configured to receive vehicle operating parameters indicating the dynamic status of the vehicle and its various systems. The TCCM 2 communicates with the other modules over the communications network 23 to implement a control strategy for implementing a transfer case range change. The TCCM 2 receives data from, and publishes data to the communication network 23. The TCCM 2 can, for example, publish one or more of the following network signals to the communication network 23:

(a) a change notification signal for indicating that a range change has been requested, for example in dependence on receipt of the range change request;

(b) a change identification signal for indicating that the attempted range change is a static change or a dynamic change;

(c) a change initialisation signal for initialising the range change; and (d) a range change completion signal for indicating that the range change has been completed; or (e) any other state which may require a different reaction from other modules on the vehicle 5.

The TCCM 2 accesses vehicle operating parameter(s) over the communication network 23 to determine the current status of vehicle systems and/or the dynamic operating parameters of the vehicle 5. For example, the TCCM 2 accesses vehicle speed data and modifies the change identification signal to indicate whether the attempted range change is static or dynamic. If the transfer case 3 does not include a synchronizer, the TCCM 2 determines that the range change is not viable if the vehicle 5 is moving and outputs a notification to the instrument pack control module 33 to inform the driver that the requested range change is not possible, optionally also indicating that the vehicle 5 should be brought to rest. Equally, if the transfer case 3 comprises a synchroniser but the TCCM 2 determines that the vehicle speed is above a predefined range change threshold, a notification is output to the instrument pack control module 33 to inform the driver that the requested range change is not possible, optionally also indicating that the vehicle 5 should be slowed.

The vehicle modules which operate to implement a successful range change include:

a transmission control module (TCM) 25 for controlling the transmission 7;

an anti-lock braking system (ABS) control module 27 for controlling the front and rear friction brakes;

a powertrain control module (PCM) 29 for controlling the powertrain;

a gear selector module (GSM) 31 for controlling driver selection of gears;

an instrument pack control module (IPCM) 33 for controlling the output of information to the driver;

an advanced terrain control module (ATCM) 35 for controlling dynamic operating parameters of the vehicle 5.

Figure 2:
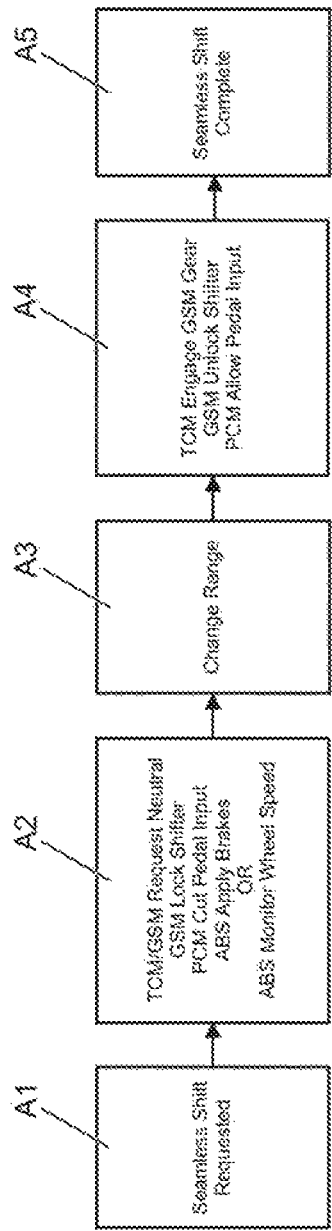
FIG. 2 shows a first block diagram illustrating operation of the vehicle control system.

The control strategy implemented by the TCCM 2 is illustrated in a first block diagram in FIG. 2. A range change request signal is received from the range change selector 21 in response to a driver request (A1). Upon receive of the range change request signal over the communications network 23, the TCM 25 and/or the GSM 31 request neutral in the transmission 7; the GSM 31 inhibits gear selection; the PCM 29 inhibits throttle pedal input; and the ABS control module 27 applies the brakes and/or controls wheel speed (A2). The transfer case 3 then performs the range change (A3). The TCM 25 engages an appropriate gear; the GSM 31 permits gear selection; and the PCM 29 enables throttle pedal inputs (A4). The range change is then complete (A5).

At least in certain embodiments, the TCCM 2 is operative to reduce the driver input to implement a range change through implementing certain conditions when the range change selector 21 is activated. As described herein, upon receipt of the range change request signal over the communications network 23, the TCCM 2 will check vehicle operating parameters to determine if a range change is viable. If the parameters comply with predefined conditions, the TCCM 2 will output the change notification signal to indicate that the range change has been requested. The GSM 31 comprises a selector, such as a gear lever, paddle(s) or a rotary dial, for selection of gears in the transmission by the driver. The GSM 31 could be provided with duplicate controls, for example steering wheel mounted paddles together with a lever.

Figure 3:
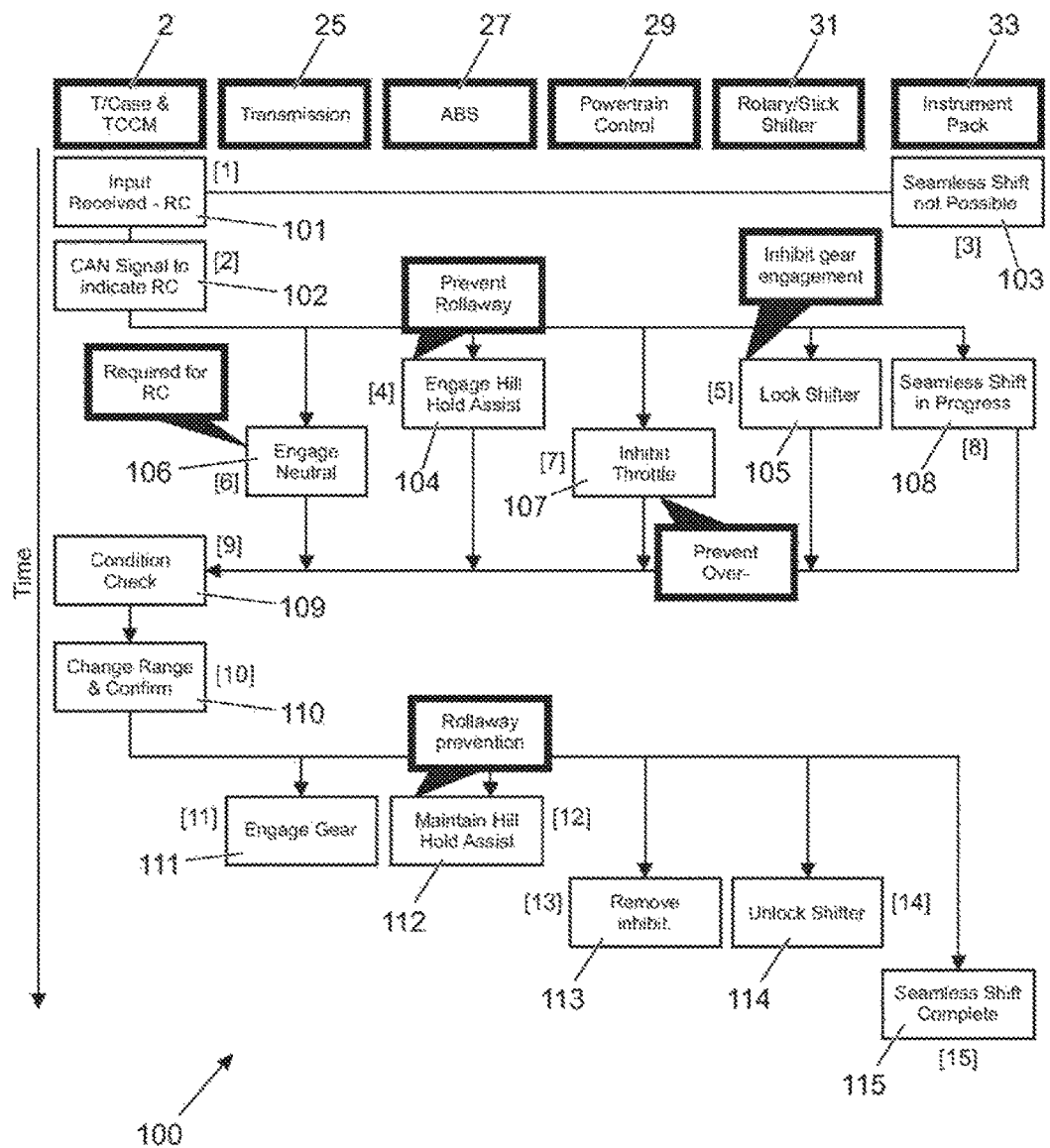
FIG. 3 shows a first flow chart showing implementation of the control strategy illustrated in FIG. 2.

The electronic modules are configured to control the associated systems based on the network signal(s) output from the TCCM 2. Upon receipt of the change notification signal, the relevant vehicle modules are operative to perform a sequence of events to allow the transfer case 3 to perform the range change successfully. As illustrated in FIG. 3, when the change notification signal is received over the communications network 23, the electronic modules implement the following control strategy:

a. The TCM 25 controls the transmission 7 to engage neutral [STEP 6] which is a requirement for range change.

b. The ABS control module 27 engages the vehicle brakes or control wheel speed [STEP 4] to prevent vehicle rollaway.

c. The PCM 29 inhibits throttle input [STEP 7].

d. The GSM 31 locks or inhibits shifting [STEP 5].

e. The IPCM 33 outputs a driver notification indicating the status of the range change [STEP 8].

Only once these steps have been successfully completed does the TCCM 2 execute the range change. The control strategy ensures that the events are performed in a timed order to eliminate the chances of the vehicle operating in an unexpected manner, for example rolling away during the range change. The static shift strategy is implemented for all range changes performed by a transfer case 3 which does not have a synchroniser; and also for a transfer case 3 having a synchroniser when the vehicle 5 is stationary. The control strategy will now be described in more detail for both static and dynamic shifts.

Static Shifting (Vehicle Stationary)

The control strategy for implementing a static range change will now be described with reference to a first flow chart 100 shown in FIG. 3. The control strategy is the same irrespective of whether the range change is from a low range to a high range or vice versa.

i. The TCCM 2 receives a range change request from the range change selector 21 [STEP 1]. The TCCM 2 assesses whether the current vehicle state is suitable to perform a range change. If the vehicle 5 is not in a suitable state, for example the vehicle 5 is moving, the IPCM 33 outputs a message [STEP 3] for display on the instrument cluster advising the driver that the range change cannot be performed. If the TCCM 2 determines that a range change is possible, the change notification signal is output to the communications network 23. In practice, the change notification signal is generated by changing the value of a communications signal [STEP 2] to indicate that the vehicle is completing a static range change.

ii. The ABS Module 27 receives the change notification signal over the communication network 23 and engages a hill hold function [STEP 4] to prevent the vehicle 5 from rolling away during the range change, for example when neutral is selected in the transmission 7. The ABS module 27 then publishes a hill hold notification to the communication network 23.

iii. Upon receipt of the change notification signal, the GSM 31 locks the gear selector [STEP 5], either mechanically or through software, to prevent the driver from engaging a gear in the transmission 7 during the range change. The GSM 31 publishes a gear selector locked notification to the communication network 23. The GSM 31 can lock the gear selector at the same time as the ABS module 27 engages the hill hold function [STEP 4].

iv. Upon receipt of the change notification signal and the gear selector locked notification, the TCM 25 engages neutral [STEP 6]. The TCM 25 publishes a neutral engaged notification to the communication network 23.

v. Upon receipt of the change notification signal and the neutral engaged notification, the PCM 29 inhibits throttle inputs [STEP 7].

vi. The TCCM 2 performs a check across all electronic modules to ensure that the preconditions for a range change are satisfied [STEP 9]. Provided the preconditions are satisfied, the TCCM 2 completes the range change shift [STEP 10] by outputting a control signal to control operation of the servo motor in the transfer case 3. The TCCM 2 also outputs the initialisation signal to the communications network 3.

vii. The TCCM 2 outputs the range change completion signal once the range change has been completed. In dependence on the range change completion signal, the TCM 25 will then engage the correct gear for the new range, or revert back to the state it was in before the range change shift was initiated [STEP 11].

viii. As a safety feature, the ABS module 27 does not remove the hill hold assist, thereby ensuring that the vehicle does not roll away once the range change has been completed [STEP 12].

ix. Upon receipt of the range change completion signal, the PCM 29 will remove the throttle inhibit [STEP 13].

x. Upon receipt of the range change completion signal, the GSM 31 will unlock the shifter [STEP 14].

xi. The IPCM 33 outputs a notification signal to display a message on the instrument cluster informing the driver that the requested range change has completed, and inform them of the new selected range [STEP 15].

The ABS module 27 removes the hill hold assist when the throttle pedal is depressed by the driver.

Dynamic Shift (Vehicle Moving)

The control strategy for implementing a dynamic range change will now be described. The control strategy is the same irrespective of whether the range change is from a low range to a high range or vice versa.

i. The TCCM 2 receives a range change request from the range change selector 21 [STEP 1]. The TCCM 2 determines whether the current vehicle state is suitable for a range change. If the vehicle 5 is not in a suitable state, for example the vehicle speed is above a low range operating threshold, the IPCM 33 outputs a message [STEP 3] for display on the instrument cluster advising the driver that the range change cannot be performed. If the TCCM 2 determines that a range change is possible, the change notification signal is output to the communications network 23. In practice, the change notification signal is generated by changing the value of a communications signal [STEP 2] to indicate that the vehicle is completing a dynamic range change.

ii. The ABS Module 27 receives the change notification signal over the communication network 23 and engages a control strategy to prevent the vehicle 5 from accelerating [STEP 4].

iii. Upon receipt of the change notification signal and confirmation that acceleration is inhibited, the GSM 31 locks the gear selector (shifter) [STEP 5], either mechanically or through software, to prevent the driver from engaging a gear in the transmission 7 during the range change. The GSM 31 then publishes a gear selector locked notification to the communication network 23.

iv. Upon receipt of the change notification signal and the gear selector locked notification, the TCM 25 engages neutral [STEP 6]. The TCM 25 then publishes a neutral engaged notification to the communication network 23.

v. Upon receipt of the change notification signal and the neutral engaged notification, the PCM 29 inhibits any throttle inputs [STEP 7].

vi. The TCCM 2 performs a check across all modules to ensure that the preconditions for a range change are satisfied. Provided the preconditions are satisfied, the TCCM 2 completes the range change shift [STEP 9 & 10] by outputting a control signal to control operation of the servo motor in the transfer case 3. The TCCM 2 also outputs the initialisation signal to the communications network 3.

vii. The TCCM 2 outputs the range change completion signal once the range change has been completed. In dependence on the range change completion signal, the TCM 25 will then engage the correct gear for the new range, or revert back to the state it was in before the range change shift was initiated [STEP 11].

viii. The ABS module 27 continues to control wheel speed until the driver intervenes with either throttle or brake pedal input [STEP 12].

ix. Upon receipt of the range change completion signal, the PCM 29 will remove the throttle inhibit [STEP 13].

x. Upon receipt of the range change completion signal, the GSM 31 will unlock the shifter [STEP 14].

xi. The IPCM 33 outputs a notification signal to display a message on the instrument cluster informing the driver that the requested range change has completed, and inform them of the new selected range [STEP 15].

In the event that the vehicle 5 comes to a standstill during a dynamic range change, the communications signal previously indicating a dynamic shift would change value to reflect that the static shift strategy should be implemented to secure the vehicle and prevent it rolling away.

The transfer case range changes can be inhibited under certain circumstances to prevent the car becoming stranded or to prevent the vehicle rolling away or losing control. For example, dynamic shifts can be inhibited during wading to prevent the vehicle rolling to a stop mid-wade and thus destroying the bow wave which may be preventing water ingress to the air inlet. Moreover, dynamic shifts can be inhibited when the brake temperature is high (for example at high speeds and/or descending a gradient) since the application of the brakes by the ABS module 27 could potentially cause an overheat scenario. The dynamic shifts can be inhibited where the differential is locked (for example above a calibratable limit) in order to prevent loss of stability and/or unintended noise vibration harshness (NVH) effects through the vehicle driveline.

Stored Request for Range Change & Long Press Functionality

The TCCM 2 in combination with the range change selector 21 can provide additional control functionality, for example to control the timing and/or the trigger events to initiate a range change. At least in certain embodiments, the driver can prime the range change selector 21 to trigger the range change through a separate control medium. The TCCM 2 can, for example, be configured to implement the range change after a defined time period has elapsed or when one or more vehicle dynamic parameters are satisfied.

This control strategy can be implemented in conjunction with, or independently of the general control strategy described herein with reference to FIGS. 2 and 3. The operating mode can be implemented in the vehicle 5 having the capability to engage a new range without a customer intervention (i.e. automatically). The range change selector 21 can operate to provide primary and secondary functions. The different sequence of events implemented by the primary and secondary functions is specific to the current operating range of the transfer case, such that the TCCM 2 reacts differently if the transfer case 3 is currently in the high range or the low range. Alternatively, or in addition, the TCCM 2 can be primed to initiate the transfer case range change in dependence on an alternative trigger.

Figure 4:
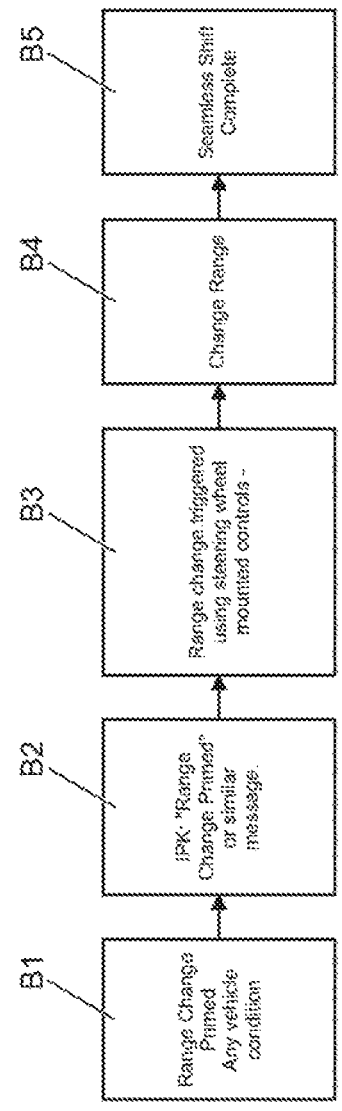
FIG. 4 shows a second block diagram illustrating operation of the vehicle control system in dependence on a trigger event.

The control strategy implemented to perform a range change after the TCCM 2 has been primed is illustrated in a second block diagram shown in FIG. 4. The TCCM 2 is primed to perform a range change (B1); and a driver prompt is output to the IPCM 33, for example to display the message "Range Change Primed" (B2). The range change can subsequently be triggered by the driver operating steering wheel mounted controls (B3). The transfer case 3 performs the range change (B4) in response to the driver request; and the range change is complete (A5).

In the present embodiment, the primary and secondary functions are selected based on the period of time for which the button is depressed (the "press time"). The press time is monitored by the TCCM 2 and different control strategies are implemented based on the detected press time. In particular, the press time is compared to a predefined first time period which can be calibrated, for example to 1 second, 2 seconds, 3 seconds or longer. If the press time is less than the first time period, the primary function is selected. If the press time is longer than the first time period, the secondary function is selected. A separate cancel function can be provided, for example on a steering wheel control. The range change selector 21 could optionally be configured to cancel the primary and secondary functions if the button is depressed for a time period longer than a predefined maximum time period. To avoid accidental operation (for example, due to an object in the vehicle falling on the range change selector 21), the range change selector 21 could optionally be configured to select the primary function only if the button is depressed for a time period longer than a minimum time period.

The primary function comprises initiating the range change based on the control strategy described herein with reference to FIG. 3. The secondary function comprises priming the TCCM 2 ready to initiate the range change when one or more specified criteria are satisfied. When the secondary function is selected, the vehicle human machine interface (HMI) can display a "primed" status signal (for example on the IPCM 33) and a low range selection light could optionally flash intermittently. The range change selector 21 can optionally be configured automatically to cancel the secondary functions if the specified criteria are not satisfied within a predefined time period.

The primary function implements a control strategy to implement a range change without undue delay (subject to the required vehicle operating parameters being satisfied). Specifically, the TCCM 2 checks the status of the vehicle 5 by accessing the data published to the communications network 23 and, provided the vehicle 5 is in a suitable state (as described herein), outputs a change notification signal to the communications network 23.

Figure 5:
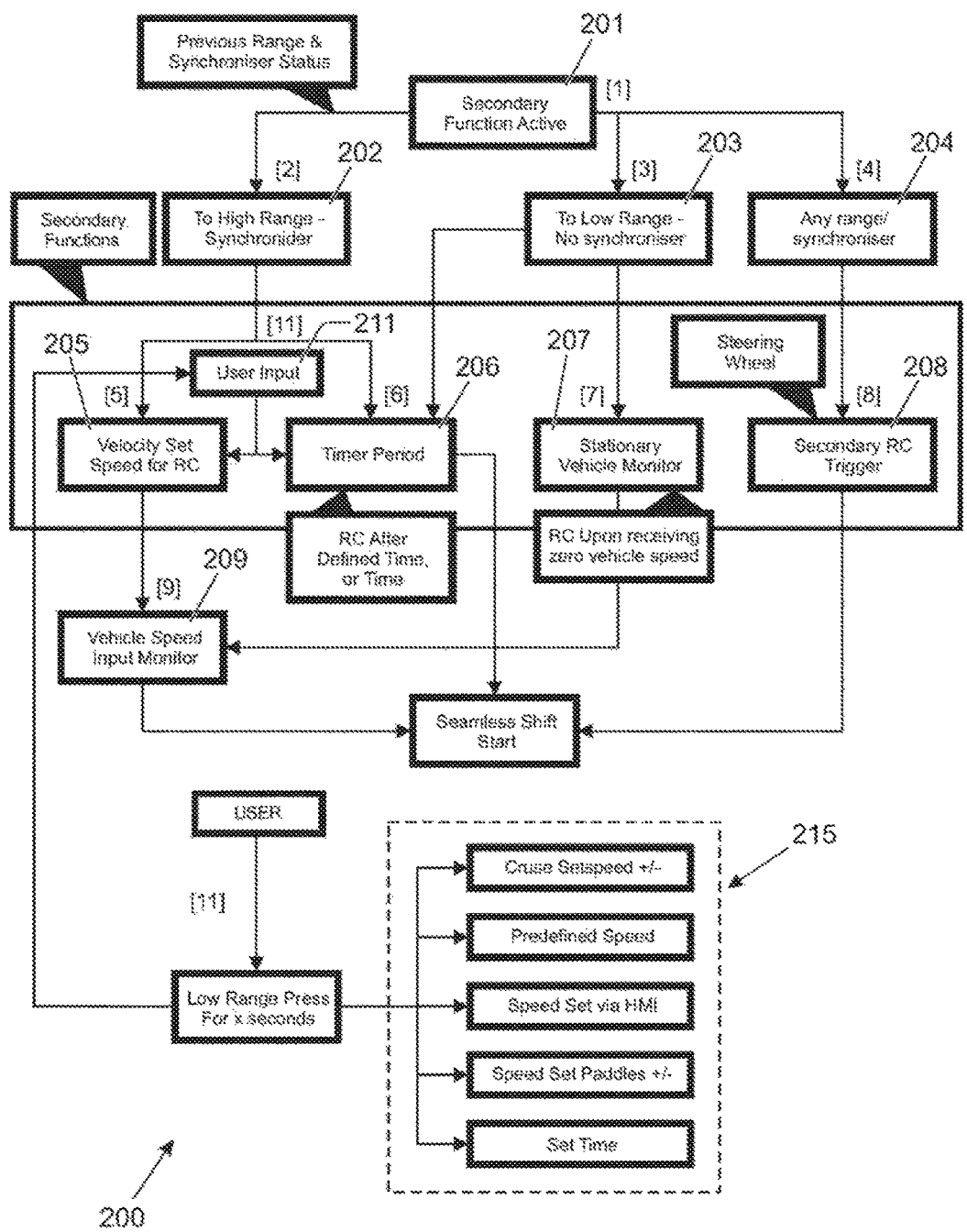
FIG. 5 shows a second flow chart showing implementation of the control strategy illustrated in FIG. 4.

With reference to the second flow chart 200 shown in FIG. 5, the secondary function comprises priming the TCCM 2 ready to implement the range change [STEP 201]. The control strategy implemented by the secondary function depends on the current operating range of the transfer case, i.e. whether the transfer case is in a high range [STEP 203] or in a low range [STEP 202]. The secondary function can comprise initiating the range change after a predefined time period has elapsed [STEP 206]; and/or when the vehicle speed is above/below a defined speed threshold [STEP 205]. Alternatively, a range change can be triggered in high or low ranges, either with or without a synchroniser [STEP 204]. In this arrangement, the driver can implement the range change using a secondary input means, for example in the form of steering wheel controls [STEP 208]. The various control strategies are described below for a transfer case 3 with and without a synchroniser.

The primary and secondary functions could be selected using different techniques. For example, the range change selector 21 could comprise separate selection means for the respective primary and second functions. For example, the range change selector 21 could comprise first and second buttons or switches for selecting the respective primary and secondary functions. Alternatively, the primary and secondary functions could be selected based on the displacement or travel of a selection means, or the actuating force applied by the user. A further alternative would be to select the secondary functions if the driver requests a range change, but the predefined operating conditions have not been satisfied and the range change selector 21 determines that the range change cannot be implemented.

Vehicle Operating in High Range

If the transfer case 3 does not have a synchroniser to low range (requiring static range changes with the vehicle stationary), the secondary function comprises:

1. Implementing a time latch to allow the vehicle 5 to change range automatically if the vehicle 5 satisfies the speed requirement (i.e. the vehicle comes to rest) within a defined period of time [STEP 206]. The period of time can be calibratable, for example by the driver (through the HMI) or can be predefined (for example by the original equipment manufacturer OEM).
2. Implementing a permanent latch [STEP 207] such that the vehicle will stay in a primed state for changing range upon satisfying the speed requirement (i.e. the TCCM 2 determines that the vehicle speed is zero) at any point in time until the range change is executed. The latch could be cancelled or removed, for example by repeating the selection process.

If the transfer case has a synchroniser to low range (permitting "shift-on-the-fly" dynamic range changes), the secondary function comprises:

1. Implementing a time latch [STEP 206] such that the vehicle will change range automatically after a set period of time. The period of time could be calibratable, for example by the driver (through the HMI), or can be predefined (for example by the OEM) and optionally output to the IPCM 33 for display.
2. Implementing a speed latch [STEP 205] such that the vehicle will change range once a set speed has been ascertained. This speed could be configurable via the HMI [STEP 211]. In particular, the driver can define the set speed using vehicle ± cruise control selectors; the HMI; dedicated speed set±controls [STEP 215]. A transition from a low range to a high range could be implemented when the vehicle speed is equal to or greater than a first (upshift) speed threshold; and a transition from a high range to a low range could be implemented when the vehicle speed is equal to or less than a second speed threshold. The first speed threshold can be less that the second speed threshold. For example, the first speed threshold can be 30 mph and the second speed threshold can be 50 mph. The first and second speed thresholds can optionally be predefined by the OEM, or could be defined by the user.

Vehicle Operating in Low Range

If the transfer case does not have a synchroniser to high range (requiring static range changes with the vehicle stationary), the secondary function comprises:

1. Implementing a time latch to allow the vehicle to change range automatically if the vehicle satisfies the speed requirement (i.e. the vehicle comes to rest) within a defined period of time. The period of time can be calibratable, for example by the driver (through the HMI), or can be predefined (for example by the OEM).
2. Implementing a permanent latch [STEP 207] such that the vehicle will stay in a primed state for changing range upon satisfying the speed requirement at any point in time until the range change is executed. The latch could be cancelled or removed, for example by repeating the selection process.

If the transfer case has a synchroniser to high range (permitting "shift-on-the-fly" dynamic range changes), the secondary function comprises:

1. Implementing a time latch [STEP 206] such that the vehicle will change range automatically after a set period of time. The period of time could be calibratable, for example by the driver (through the HMI), or can be predefined (for example by the OEM) and optionally output to the IPCM 33 for display.
2. Implementing a speed latch [STEP 205] such that the vehicle will change range once a set speed has been ascertained. This speed could be configurable via the HMI [STEP 211], for example using the steering wheel mounted control for setting a cruise control set speed and/or automatic speed limiter set speed.

The TCCM 2 outputs the control signal to control the transfer case 3 to implement the requested range change once the relevant criteria are satisfied [STEP 213]. The TCCM 2 can implement the range change without further input from the driver when the relevant criteria are satisfied. Alternatively, when the relevant criteria are satisfied, the TCCM 2 can output a prompt seeking confirmation from the driver that the range change is to be implemented.

The primary and secondary functions could be selected based on the period of time for which an actuator is held in a predefined position, for example against a stop. The primary function could be selected by displacing the actuator to the predefined position; and the secondary function could be selected by holding the actuator in said predefined position for a time period longer than the first time period described herein. The actuator could be spring-biased away from the predefined position, for example to a neutral position. The actuator could, for example, be a lever, a switch or a rotary knob.

It will be appreciated that, at least in certain embodiments, the range change selector 21 can enable both the primary and secondary functions to be selected using a single selection device, such as a button. This dual function could optionally be supplemented with a further control device, such as a touchscreen, a touch-panel or a rotary selector, to provide additional control functions. For example, the range change selector 21 could be configured to activate a control screen to calibrate related functionality. For example, the control screen could allow the locking torque of a differential to be adjusted. A slider displayed onscreen (or other soft input device) could be used to adjust the locking torque. This function is believed to be patentable independently of the other techniques described herein.

Trailer Tow Mode Interface & Hill Climb Assist

The TCCM 2 can operate to provide trailer towing and/or hill climb assist functionality. At least in certain embodiments, this operating mode can improve the driver's control when setting off with a trailer coupled to the vehicle 5 or when travelling up an incline. A trailer connected signal is published to the communications network 23 when a trailer socket is connected to the vehicle. The TCCM 2 checks the trailer connected signal and, upon determining that a trailer has been connected, generates a driver prompt to engage the transfer case low range. The driver prompt is published to the communications network 23 and can be displayed on the IPCM 33, for example. The driver can accept or dismiss the recommendation, for example by operating the range change selector 21 or steering wheel controls. Conversely, when the trailer is removed, the TCCM 2 can output a recommendation to engage the transfer case high range. The recommendation could again be published to the communications network 23 for display on the IPCM 33.

Figure 6A:
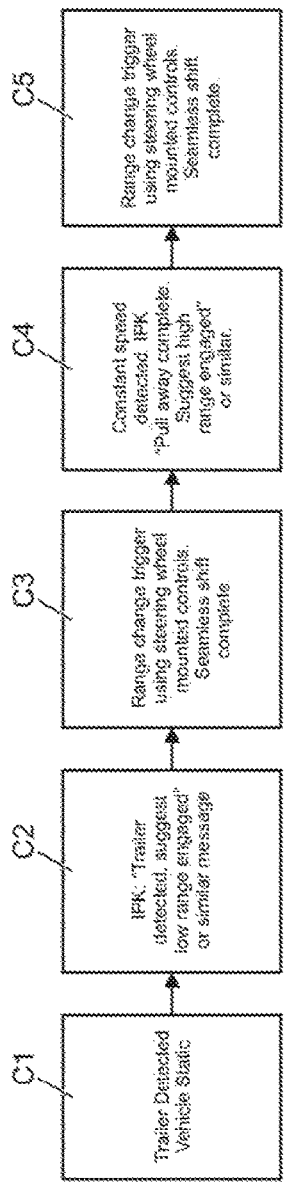
FIGS. 6A and 6B show respective third and fourth block diagrams illustrating operation of the vehicle control system when a trailer is detected.

The control strategy implemented by the TCCM 2 when the vehicle 5 is static is illustrated in a third block diagram shown in FIG. 6A. The TCCM 2 detects a trailer connected signal over the communications network indicating that a trailer is connected to the vehicle 5 (C1). The TCCM 2 outputs a driver prompt to the IPCM 33, for example to display the message "Trailer detected, suggest low range engage" (C2). The driver can then implement the range change from high to low using the range selector means 21, for example disposed on the steering wheel (C3). The TCCM 2 continues to monitor the vehicle speed and once a constant speed has been detected, a driver prompt is output to the IPCM 33, for example to display the message "Pull away complete. Suggest high range engaged." (C4). The driver can then implement the transfer case range change from low to high using the range selector means 21 (C5).

Figure 6B:
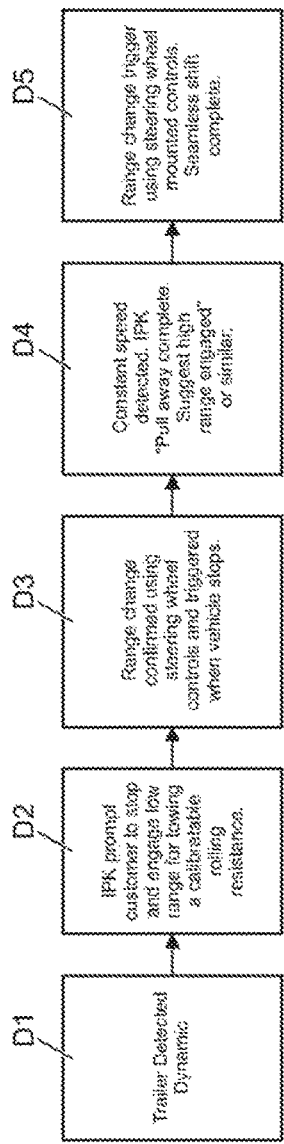

The control strategy implemented by the TCCM 2 when the vehicle 5 is moving is illustrated in a fourth block diagram shown in FIG. 6B. The TCCM 2 detects a trailer connected signal over the communications network indicating that a trailer is connected to the vehicle 5 (D1). The TCCM 2 outputs a driver prompt suggesting that the driver stop and engage low range for towing a calibratable rolling resistance (D2). The driver can then implement the range change from high to low using the range selector means 21, for example disposed on the steering wheel, when the vehicle 5 has stopped (D3). The TCCM 2 continues to monitor the vehicle speed and once a constant speed has been detected, a driver prompt is output to the IPCM 33, for example to display the message "Pull away complete. Suggest high range engaged" (D4). The driver can then implement the transfer case range change from low to high using the range selector means 21 (D5).

A range change request signal is received from the range change selector 21 in response to a driver request (A1). Upon receive of the range change request signal over the communications network 23, the TCM 25 and/or the GSM 31 request neutral in the transmission 7; the GSM 31 inhibits gear selection; the PCM 29 inhibits throttle pedal input; and the ABS control module 27 applies the brakes and/or controls wheel speed (A2). The transfer case 3 then performs the range change (A3). The TCM 25 engages an appropriate gear; the GSM 31 permits gear selection; and the PCM 29 enables throttle pedal inputs (A4). The range change is then complete (A5).

A calibratable speed threshold can optionally be set at which the TCCM 2 prompts the driver to engage high range. The TCCM 2 can, for example, monitor the vehicle speed and output the prompt once the vehicle 5 is moving at a constant speed; or a high enough vehicle speed has been detected that low range is no longer necessary. The speed threshold could be set through the use of steering wheel mounted controls, or through the use of the range change selector 21. This functionality could also be incorporated into the low range $V_{max}$ upshift discussed herein.

This control strategy can be implemented in conjunction with, or independently of the general control strategy described herein with reference to FIGS. 2 and 3. The TCCM 2 checks the communication network 23 for a towing signal indicating that a trailer is connected to the vehicle 5. Alternatively, or in addition, the TCCM 2 (or other control logic) can monitor one or more of the following: powertrain torque, vehicle orientation and acceleration to determine if high torque is required for running. The high torque requirement can in itself provide a suitable indicator that the vehicle 5 is towing a trailer.

Upon detection of a positive towing signal or an overly heavy load upon the powertrain, the TCCM 2 outputs a driver prompt recommending that the transfer case low range is engaged to provide improved vehicle control. The driver prompt can, for example, be output to the driver as a message through the High Level Display Front (HLDF) or the IPCM 33. In response to the prompt, the driver can implement the range change either through the use of steering wheel mounted controls or the range change selector 21 (utilising the primary or secondary function described herein). The range change function is the same irrespective of whether the driver uses the steering wheel mounted controls or the range change selector 21 to implement the range change. The message can be dismissed, for example using the steering wheel controls.

When in low range and cruising at a (steady-state) speed after setting off with a trailer, the TCCM 2 prompts the driver to engage high range. The cruising speed can be calibratable, for example by the driver or the OEM. This functionality can optionally be inhibited if the vehicle is operating in an off-road mode. The prompt can, for example, be output to the driver as a message through the High Level Display Front (HLDF) or the IPCM 33. In response to the prompt, the driver can implement the range change either through the use of steering wheel mounted controls or the range change selector 21 (utilising the primary function associated therewith). The range change function is the same irrespective of whether the driver uses the steering wheel mounted controls or the range change selector 21 to implement the range change. The message can be dismissed, for example using the steering wheel controls.

The TCCM 2 can also monitor the communications network 23 to determine the vehicle orientation (which can, for example, be measured by one or more gyroscopes and/or accelerometers disposed on the vehicle). If the vehicle orientation exceeds a defined threshold, the TCCM 2 determines that the vehicle 5 is on a steep incline and outputs a prompt to the driver to engage low range. Again, the TCCM 2 could determine that the vehicle is starting off on an incline based on the powertrain torque required to displace the vehicle.

Low Range $V_{max}$ Upshift

The TCCM 2 can operate to change from a low range to a high range based on the vehicle speed and/or acceleration. This operating mode allows the TCCM 2 to change range automatically during hard acceleration or as the speed of the vehicle approaches that of the maximum speed capability in low range. The TCCM 2 can be configured automatically to change from low range to high range when the acceleration rate of the vehicle results in the low range $V_{max}$ (i.e. the maximum permitted vehicle speed when the low range is engaged) being reached or exceeded. The TCCM 2 can also provide a calibratable speed at which the vehicle will automatically perform a change from low range to high range depending on various signals received over the communications network 23.

Figure 7:
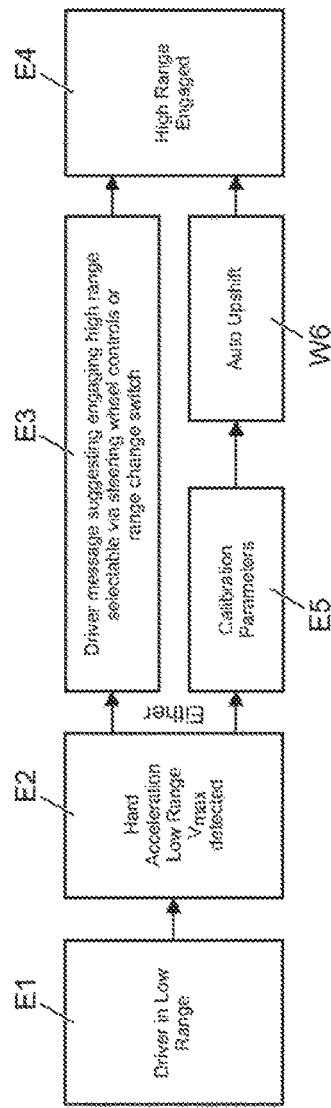
FIG. 7 shows a fifth block diagram illustrating operation of the vehicle control system in dependence on vehicle speed and acceleration.

The control strategy implemented by the TCCM 2 is illustrated in a fifth block diagram shown in FIG. 7. The TCCM 2 detects that the transfer case 3 is operating in a low range (E1). The TCCM 2 monitors vehicle acceleration and determines when the vehicle speed is equal to or greater than a maximum low range speed $V_{MAX}$ (E2). The TCCM 2 outputs a driver prompt to the IPCM 33 to recommend that high range is engaged, either by the steering wheel controls or the range selector means 21 (E3). The driver can then implement the range change from low to high using the range selector means 21 (E4). The TCCM 2 could alternatively be configured to implement an automated range change by checking the calibration parameters (E5); and, provided these are satisfied, performing an automated transfer case upshift from low range to high range (E6). The transfer case 3 can perform the upshift automatically without the need for driver input (E4).

The TCCM 2 can also implement an automated shift into high range when a kickdown switch on the throttle pedal is activated. The TCCM 2 can be configured to detect a kickdown signal over the communications network 23 when the kickdown switch is activated. This operating mode would also play a role in the functional safety of the system, allowing an automatic shift to high range to increase the maximum speed of the vehicle, for example when the driver forgets that they are in low range and accelerates onto a high speed road.

Figure 8:
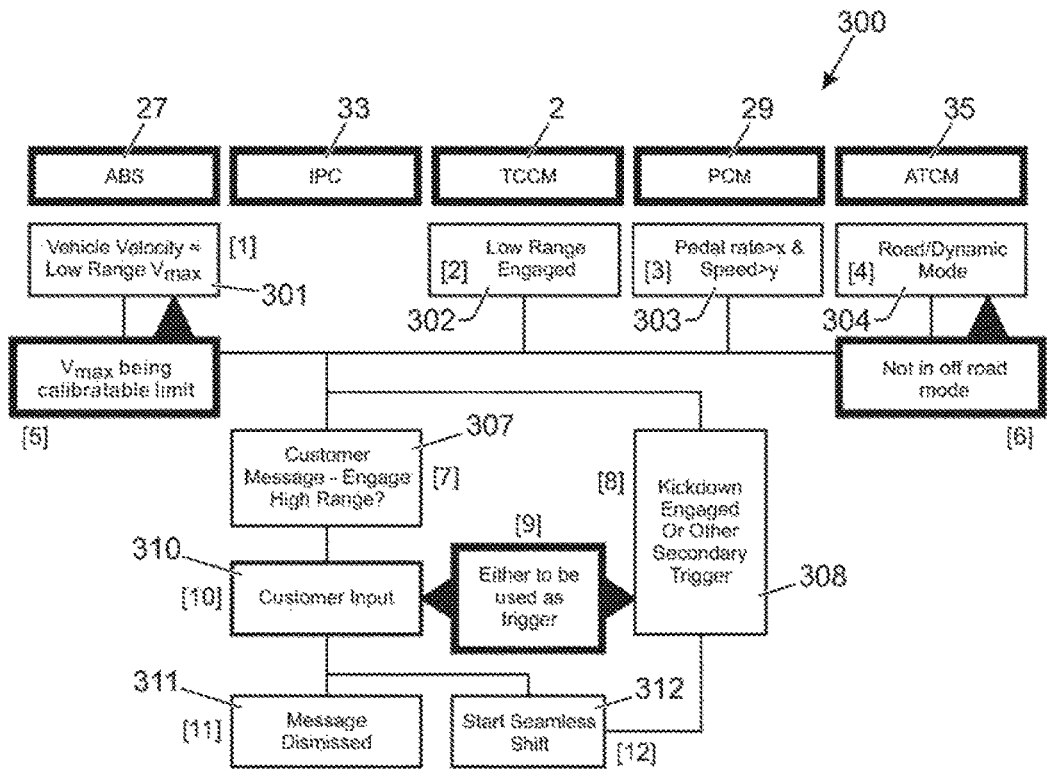
FIG. 8 shows a third flow chart showing implementation of the control strategy illustrated in FIG. 7.

This control strategy can be implemented in conjunction with, or independently of the general control strategy described herein with reference to FIGS. 2 and 3. This operating mode is illustrated in the third flow diagram 300 shown in FIG. 8. The TCCM 2 determines that the transfer case 3 is in a low range [STEP 302]. The TCCM 2 is configured to monitor vehicle acceleration, vehicle speed and throttle position to assess how aggressively the driver is driving [STEP 303]. When in low range, these parameters can be monitored to predict the point at which the vehicle will reach a maximum speed threshold for low range [STEP 301]. When the vehicle 5 is at or near this maximum speed threshold the TCCM 2 can output information to the IPCM 33 [STEP 307] to prompt the driver to change from low range to high range. The driver can implement the range change using the range change selector 21 to implement the primary or secondary functions described herein [STEP 310].

The driver can dismiss the information displayed on the IPCM 33 [STEP 311]. Alternatively, the driver can operate the range change selector 21 to implement the range change [STEP 312]. In response to the user input, the TCCM 2 initiates the range change.

A secondary upshift means could be identified, such as the kickdown switch [STEP 308] on the throttle pedal. The TCCM 2 can be configured to implement the range change when the kickdown switch is operated. The point at which this behaviour is effective could be calibrated so as not to interfere with the intent to change down a number of gears to maximise acceleration.

Alternatively, a timing method could be employed such that if a certain amount of throttle were seen over a given period of time then the vehicle would shift to high range. This would also be calibratable to show the intent of the driver to accelerate even though they have reached the maximum velocity in low range.

Engine Start Range Check

This operating mode automatically checks whether low range is required when the engine is started. This mode can assist the driver to select the appropriate transfer case range after having driven the vehicle 5 off-road or after a trailer is decoupled. The range change can, for example, be implemented through the use of range change selector 21 or the steering wheel controls.

Figure 9:
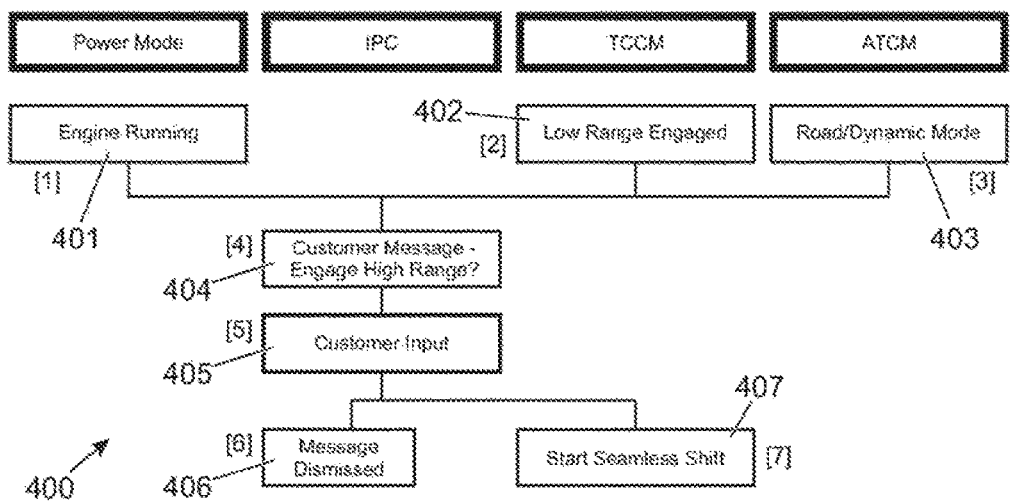
FIG. 9 shows a fourth flow chart showing implementation of the control strategy upon engine ignition.

This control strategy can be implemented in conjunction with, or independently of the general control strategy described herein with reference to FIGS. 2 and 3. This operating mode is illustrated in the fourth flow diagram 400 shown in FIG. 9. The TCCM 2 detects an engine ignition signal over the communications network [STEP 401]. The TCCM 2 monitors the current transfer case range [STEP 402] and the vehicle operating mode currently active in the ATCM 35 [STEP 403]. If the transfer case low range is engaged and the vehicle operating mode is configured for transfer case high range (for example the ATCM 35 is operating in a Road/Dynamic mode), the TCCM 2 outputs a driver prompt upon detection of the ignition cycle [STEP 404]. The driver prompt recommends that the transfer case high range is engaged. The prompt can, for example, take the form of a message displayed on the IPCM 33. The driver makes the appropriate input [STEP 405]. To perform the range change, the driver can activate the range change selector 21 to provide the primary or secondary functions described herein [STEP 407].

The message can optionally be dismissed [STEP 406] by the driver, for example through the use of the steering wheel mounted controls. The TCCM 2 would inhibit output of the prompt if the ATCM 35 is in an operating mode which defaults to the transfer case low range (for example an off-road mode, such as rock crawl).

Vehicle Operating Mode Interface

The TCCM 2 can be integrated with other vehicle systems, such as the ATCM 35 for engaging different vehicle operating modes, such as: Rock Crawl; Mud; Sand; Grass/Gravel/Snow; Road; and Dynamic. Some of the vehicle operating modes (such as Rock Crawl) can optionally be configured to require that the transfer case operates in a low range. Conversely, some of the vehicle operating modes can optionally be configured to require that the transfer case operates in a high range. Some or all of the vehicle operating modes can have a preferred transfer case operating range which is not essential. For example, the Mud, Sand and Grass/Gravel/Snow operating modes can be optimised for operation in the transfer case low range; and the Road and Dynamic operating modes can be optimised for operation in the transfer case high range. In the past, the driver would have been required manually to engage the appropriate transfer case range based on the selected vehicle operating mode.

If the transfer case high range is engaged, the TCCM 2 is configured automatically to engage low range when a vehicle operating mode requiring low range is selected (either by the driver or automatically). The TCCM 2 can engage low range 1 after a period of time has elapsed (the period of time can optionally be calibrated by the driver or the OEM). When a different vehicle operating mode is selected, for example one optimised for operation in the transfer case high range, the TCCM 2 can prompt the driver to confirm whether they still require low range. At least in certain embodiments, when an operating mode is selected which requires the transfer case high range, the TCCM 2 can automatically engage the transfer case high range, for example in anticipation of a higher speed driving.

This control strategy can be implemented in conjunction with, or independently of the general control strategy described herein with reference to FIGS. 2 and 3. This operating mode is applicable to a vehicle 5 operable in different modes which alter the response of the vehicle characteristics (such as performance, driveability and dynamics). One or more of the vehicle operating modes can require (or would be complemented by) engagement of the transfer case low range, for example to aid traction. The vehicle operating modes can broadly be classified as off-road modes and on-road modes. The off-road modes can further be classified as low-range off-road modes (i.e. off-road operating modes which require or are complemented by selecting low range) and high-range off-road modes (i.e. off-road operating modes which do not require selection of the low range). In the present embodiment, the low-range off-road modes are Rock Crawl and Mud; and the high-range off-road modes are Sand and Grass Gravel Snow (GGS). In the present embodiment, the on-road modes, such as Road and Dynamic, are usually selected when the vehicle will be driving at speeds above that allowed in the transfer case low range (and when improved fuel economy is required) so the transfer case high range is typically engaged. The vehicle operating modes can be selected by the driver, for example through the HMI, or automatically by the vehicle 5. The TCCM 2 accesses the communications network 23 to determine which vehicle operating mode is currently selected and accesses a look-up table to determine whether the selected vehicle operating mode is a low-range off-road mode or a high-range off-road mode.

Figure 10:
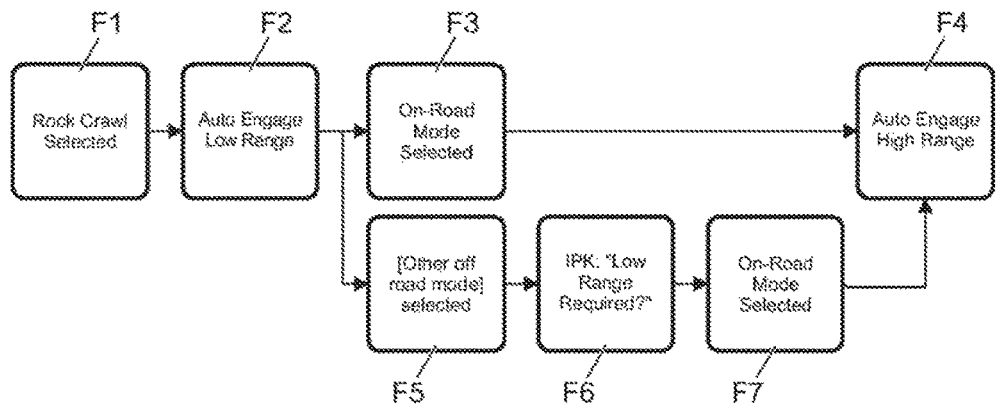
FIG. 10 shows a sixth block diagram illustrating operation of the vehicle control system in dependence on a selected vehicle operating mode.

This operating strategy for integrating the TCCM 2 with the ATCM 35 is illustrated in a sixth block diagram shown in FIG. 10. The ATCM 35 is operated to select a Rock Crawl mode (F1) and the low range is automatically engaged (F2). If the ATCM 35 is subsequently operated to select a Road mode (F3), the TCCM 2 controls the transfer case 3 automatically to select the high range (F4). If the ATCM 35 is operated to select an off-road mode other than Rock Crawl (F5), a prompt is output to the IPC 33 to display the message "Low Range Required?" (F6). If a Road mode is subsequently selected (F7), the TCCM 2 controls the transfer case 3 to engage the high range (F4).

Figure 11:
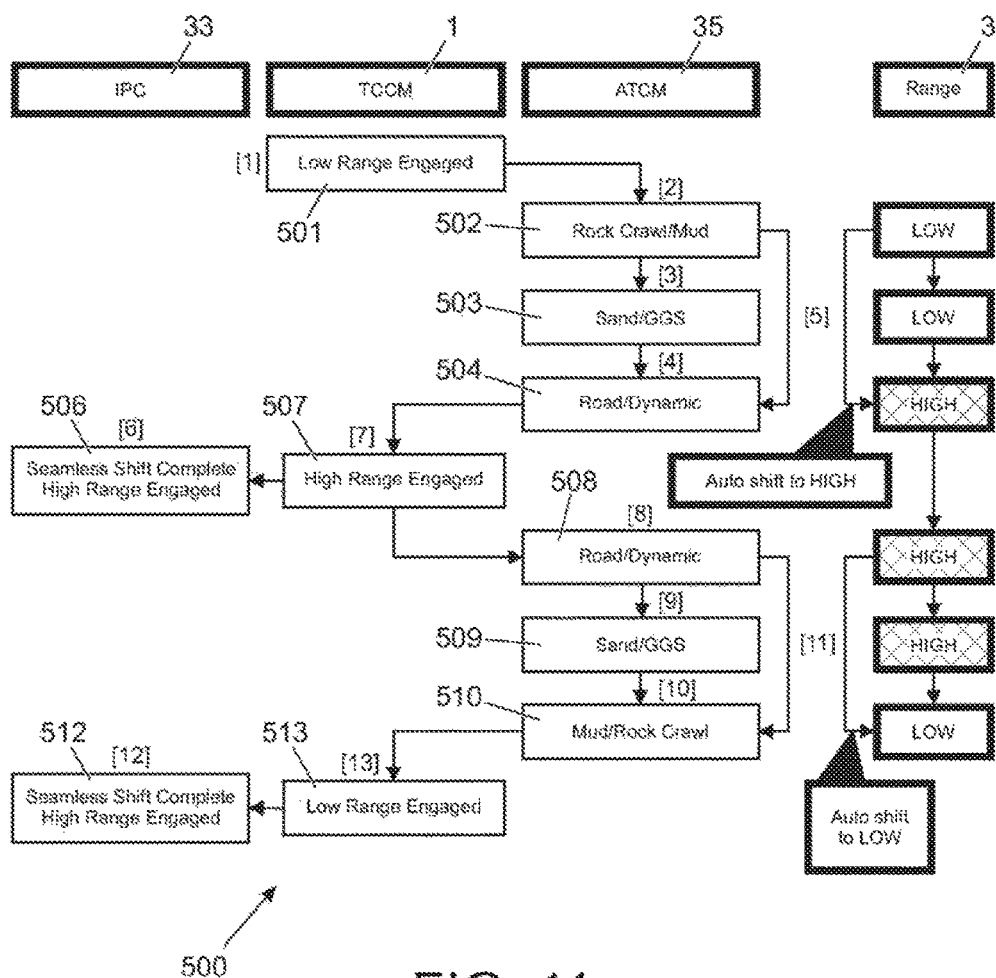
FIG. 11 shows a fifth flow chart showing implementation of the control strategy illustrated in FIG. 10.

This control mode will now be described with reference to a fifth flow chart 500 shown in FIG. 11 (the selected high/low range of the transfer case 3 is illustrated in the right hand column). When engaging a low-range off-road operating mode, the TCCM 2 starts a timer before automatically engaging low range. When disengaging that vehicle operating mode, the TCCM 2 automatically engages a transfer case high range.

When the transfer case low range is engaged [STEP 501], the TCCM 2 implements the following control logic:
  i. The TCCM 2 will not engage the high range if a low-range off-road operating mode is disengaged [STEP 502] and another off-road operating mode is selected [STEP 503] (irrespective of whether the newly selected operating mode is a high-range or a low-range off-road operating mode).
  ii. The TCCM 2 will engage the high range if an on-road vehicle operating mode is selected [STEP 505].
  iii. If an on-road mode is engaged indirectly after a low-range off-road operating mode, the TCCM 2 will engage high range [STEP 504].
  iv. If a high-range off-road operating mode is engaged then the TCCM 2 will not shift to low range unless requested to do so by the driver.

The high range is engaged [STEP 507] and the range change is then completed [STEP 506].

When the transfer case high range is engaged [STEP 507], the TCCM 2 implements the following control logic:
  i. The TCCM 2 remains in the high range if the vehicle operating mode changes from an on-road operating mode [STEP 508] to a high-range off-road operating mode [STEP 509].
  ii. The TCCM 2 will engage the low range if a low-range off-road operating mode is engaged [STEP 510].

The high range is engaged [STEP 513] and the range change is then completed [STEP 512].

The TCCM 2 will not automatically change range (from high to low range; or from low to high range) when the vehicle operating modes change based on automated control logic.

Furthermore, the TCCM 2 can be configured to inhibit range changes if the range change would result in a reduction in the output (drive) torque. A transfer case upshift typically results in a decrease in the engine speed which can result in a corresponding reduction in the output torque, particularly for a petrol internal combustion engine.

It will be appreciated that various changes and modifications can be made to the present invention without departing from the scope of the present application.

The invention claimed is:

1. A vehicle control system for controlling a vehicle transfer case operable in a high range and a low range and adapted to change range while the vehicle is in motion; the control system being configured to:
  determine an operating range for the transfer case based on a selected vehicle operating mode, the selected vehicle operating mode defining at least one of: steering response; throttle response; engine mapping; brake mapping; output torque; anti-lock braking control; or wheel slip parameters; and
  output a range change signal to implement a range change to engage the determined operating range.

2. A vehicle control system as claimed in claim 1, wherein the control system is configured to receive an operating mode signal indicating the selected vehicle operating mode and to access a look-up table to identify the operating range defined for the selected vehicle operating mode.

3. A vehicle control system as claimed in claim 1, wherein the control system is configured to identify the selected vehicle operating mode from a plurality of vehicle operating modes.

4. A vehicle control system as claimed in claim 3, wherein said vehicle operating modes comprise a plurality of off-road operating modes and
  wherein said off-road operating modes comprise one or more low range off-road modes requiring that the transfer case operates in said low range, and one or more high range off-road modes requiring that the transfer case operates in said high range.

5. A vehicle control system as claimed in claim 4, wherein the control system is configured to output said range change signal to implement a change from said high range to said low range when the vehicle operating mode changes from one of said one or more high range off-road modes to one of said one or more low range off-road modes.

6. A vehicle control system as claimed in claim 3, wherein said vehicle operating modes comprise at least one on-road operating mode requiring that the transfer case operates in said high range and
  wherein the control system is configured to output said range change signal to implement a change from said low range to said high range when the vehicle operating mode changes from a low range off-road operating mode to said at least one on-road operating mode.

7. A vehicle control system as claimed in claim 3, wherein said vehicle operating modes comprise a towing mode and
  when said towing mode is selected, the control system is configured to output said range change signal to implement a range change based on vehicle speed.

8. A vehicle control system as claimed in claim 7, wherein the control system is configured to output said range change signal to implement a range change from the low range to the high range when the vehicle speed increases above a first towing speed threshold; and/or the control system is configured to output said range change signal to implement a range change from the high range to the low range when the vehicle speed decreases below a second towing speed threshold, wherein the first towing speed threshold is the same as or different from the second towing speed threshold.

9. A vehicle control system as claimed in claim 3, wherein said vehicle operating modes comprise a hill climb assist mode.

10. A vehicle control system as claimed in claim 9, wherein, when said hill climb assist mode is selected, the control system is configured to output said range change signal to implement a range change based on vehicle speed and/or
- to output said range change signal to implement a range change from the high range to the low range when the vehicle speed decreases to zero and/or
- to output said range change signal to implement a range change from the low range to the high range when the vehicle speed increases above a hill climb threshold and/or
- to output said range change signal automatically upon identification of a change in vehicle operating mode and/or
- to output a user prompt requesting confirmation to implement said range change upon identification of the change in vehicle operating mode.

11. A vehicle comprising a vehicle control system as claimed in claim 1.

12. A method of controlling a vehicle transfer case operable in a high range and a low range and adapted to change range while the vehicle is in motion; the method comprising:
- determining an operating range for the transfer case based on a selected vehicle operating mode, the selected vehicle operating mode defining at least one of: steering response; throttle response; engine mapping; brake mapping; output torque; anti-lock braking control; or wheel slip parameters; and
- outputting a range change signal to implement a range change to engage the determined operating range.

13. A method as claimed in claim 12 comprising receiving an operating mode signal indicating the selected vehicle operating mode and
- comprising accessing a look-up table to identify the operating range defined for the selected vehicle operating mode.

14. A method as claimed in claim 12 comprising identifying the selected vehicle operating mode from a plurality of vehicle operating modes.

15. A method as claimed in claim 14, wherein said plurality of vehicle operating modes comprise a plurality of off-road operating modes.

16. A method as claimed in claim 15, wherein said off-road operating modes comprise one or more low range off-road modes requiring that the transfer case operates in said low range; and one or more high range off-road modes requiring that the transfer case operates in said high range.

17. A method as claimed in claim 14, wherein said vehicle operating modes comprise at least one on-road operating mode requiring that the transfer case operates in said high range and
- wherein the method further comprises outputting said range change signal to implement a change from said low range to said high range when the vehicle operating mode changes from a low range off-road operating mode to said at least one on-road operating mode.

18. A method as claimed in claim 14, wherein said vehicle operating modes comprise a towing mode and
- wherein the method further comprises outputting said range change signal to implement a range change based on vehicle speed in dependence on selection of said towing mode.

19. A method as claimed in claim 18, comprising outputting said range change signal to implement a range change from the low range to the high range when the vehicle speed increases above a first towing speed threshold; and/or outputting said range change signal to implement a range change from the high range to the low range when the vehicle speed decreases below a second towing speed threshold, wherein the first towing speed threshold is the same as or different from the second towing speed threshold.

20. A method as claimed in claim 14, wherein said vehicle operating modes comprise a hill climb assist mode and, further comprising,
- outputting said range change signal to implement a range change based on vehicle speed when said hill climb assist mode is selected and/or
- outputting said range change signal to implement a range change from the high range to the low range when the vehicle speed decreases to zero and/or
- outputting said range change signal to implement a range change from the low range to the high range when the vehicle speed increases above a hill climb threshold and/or
- outputting said range change signal automatically upon identification of a change in vehicle operating mode and/or
- outputting a user prompt requesting confirmation to implement said range change upon selection of the vehicle operating mode.

* * * * *